(167.)   THOMAS TODD & WILLIAM TODD.

Combined Water Gauge and Cock.

No. 121,914.   Patented Dec. 12, 1871.

UNITED STATES PATENT OFFICE.

THOMAS TODD AND WILLIAM TODD, OF SCHENECTADY, NEW YORK.

IMPROVEMENT IN COMBINED WATER-GAUGES AND COCKS.

Specification forming part of Letters Patent No. 121,914, dated December 12, 1871.

*To all whom it may concern:*

Be it known that we, THOMAS TODD and WILLIAM TODD, of Schenectady, in the county of Schenectady and State of New York, have invented certain new and useful Improvements in Combined Water-Gauge and Gauge-Cock; and we do hereby declare that the following is a full, clear, and exact description thereof, reference being had to the accompanying drawing and to the letters of reference marked thereon which form a part of this specification.

The nature of our invention consists in the construction and arrangement of a combination water-gauge and gauge-cocks, as will be hereinafter more fully set forth.

In order to enable others skilled in the art to which our invention appertains to make and use the same, we will now proceed to describe its construction and operation, referring to the annexed drawing, in which—

Figure 2:
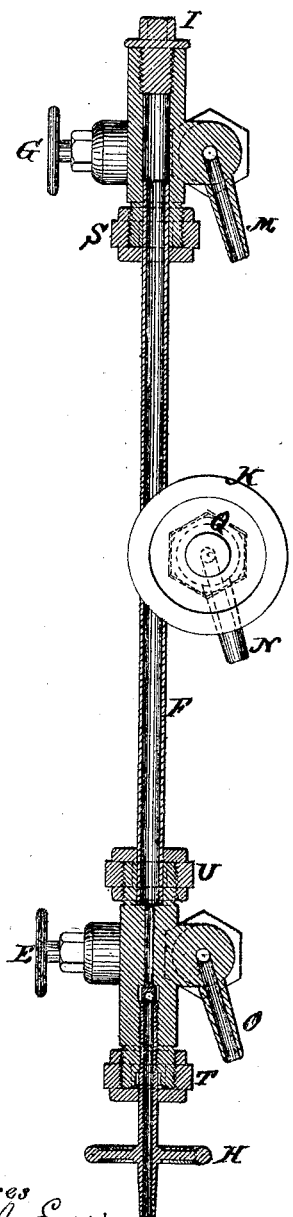
Figure 1:
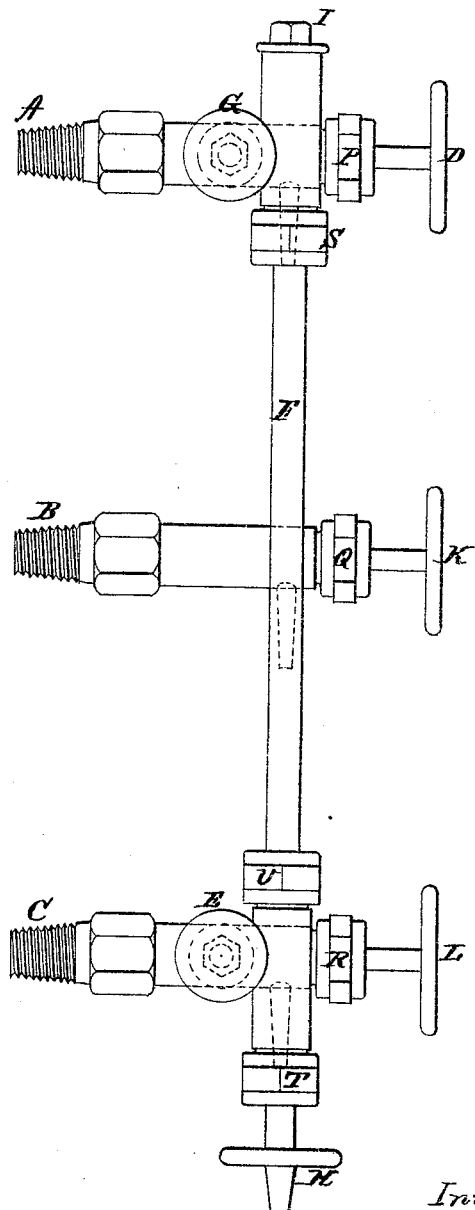

Figure 1 is a side view, and Fig. 2 a longitudinal section.

Our apparatus is secured to the boiler in the front, at any convenient angle, by means of the three screw-barrels A, B, and C, so as to be under the control of the engineer, and said screw-barrels are provided with gauge-cocks D, K, and L, respectively. Should the apparatus be placed in a perpendicular position the gauge-cock D will be at the top. The lower barrel C is provided with a perpendicular tube, having a valve, H, at the lower end, and also a side valve, E, connecting said tube with the barrel C. The upper barrel A is in like manner provided with a perpendicular tube having a set-screw, I, in the upper end and also a side valve, G, connecting said tube with the upper barrel. The two perpendicular tubes are connected by a glass tube, F. The bottom-side valve E admits the water from the boiler into the glass tube F, where the height of the water is exactly shown, by reason of being on the same level. The top-side valve G admits the steam from the boiler into the glass tube F, from which the water may be expelled at times through the valve H at the bottom. The top set-screw I may be removed, so as to insert a new glass tube, should one become broken. In case of such an accident the two side valves E G must be closed and the gauge-cocks D K L used for ascertaining the height of the water in the boiler. The nipples M, N, and O are discharges from the gauge-cocks. The nuts P, Q, R, S, T, and U are packing-nuts, constructed and applied in the usual manner for such nuts.

Having thus fully described our invention, what we claim as new, and desire to secure by Letters Patent, is—

The combination of the screw-barrels A B C with their gauge-cocks D K L, side valves E G, glass tube F, bottom valve H, and top set-screw I, all constructed and arranged to operate substantially as and for the purposes herein set forth.

In testimony that we claim the foregoing as our own we affix our signatures in presence of two witnesses.

THOMAS TODD.
WILLIAM TODD.

Witnesses:
LUCIUS N. VOIGT,
JEROME G. MORGAN. (167)